(12) United States Patent
Iovanna et al.

(10) Patent No.: US 10,567,969 B2
(45) Date of Patent: Feb. 18, 2020

(54) COMMUNICATIONS NETWORK CONTROL

(71) Applicant: TELEFONAKTIEBOLAGET LM ERICSSON (PUBL), Stockholm (SE)

(72) Inventors: Paola Iovanna, Pisa (IT); Giulio Bottari, Pisa (IT); Filippo Ponzini, Pisa (IT); Stefano Ruffini, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/748,765

(22) PCT Filed: Aug. 6, 2015

(86) PCT No.: PCT/EP2015/068186
§ 371 (c)(1),
(2) Date: Jan. 30, 2018

(87) PCT Pub. No.: WO2017/020966
PCT Pub. Date: Feb. 9, 2017

(65) Prior Publication Data
US 2019/0014479 A1 Jan. 10, 2019

(51) Int. Cl.
*H04J 14/00* (2006.01)
*H04W 16/10* (2009.01)
*H04W 28/16* (2009.01)
*H04W 76/12* (2018.01)
*H04Q 11/00* (2006.01)

(52) U.S. Cl.
CPC ........... *H04W 16/10* (2013.01); *H04W 28/16* (2013.01); *H04J 14/00* (2013.01); *H04Q 11/00* (2013.01); *H04W 76/12* (2018.02)

(58) Field of Classification Search
CPC ..... H04W 16/10; H04W 28/16; H04W 76/12; H04Q 11/00; H04J 14/00
USPC .................... 398/43–103, 115–117
See application file for complete search history.

(56) References Cited

U.S. PATENT DOCUMENTS

| | | | | |
|---|---|---|---|---|
| 6,353,600 B1 * | 3/2002 | Schwartz | .............. | H04W 28/26 370/328 |
| 9,866,347 B2 * | 1/2018 | Sarashina | ........ | H04B 10/25754 |
| 10,009,673 B1 * | 6/2018 | Liu | .................... | H04Q 11/0067 |

(Continued)

FOREIGN PATENT DOCUMENTS

WO    2015094256 A1    6/2015

OTHER PUBLICATIONS

Ohlen et al, Software defined networking in a multi purpose DWDM centric metro aggregation network, Dec. 2013, IEEE, All Document. (Year: 2013).*

(Continued)

*Primary Examiner* — Dibson J Sanchez
(74) *Attorney, Agent, or Firm* — Sage Patent Group

(57) ABSTRACT

A method of operation of a communications network comprises receiving a plurality of dynamic radio traffic requests from wireless communications nodes. The traffic requests comprise requests for backhaul traffic received from radio base stations, and requests for fronthaul traffic to digital units received from remote radio units. The radio traffic requests are translated into corresponding transport layer requirements. Transport network resources are requested for the radio traffic based on the transport layer requirements, which meet the radio traffic requests.

14 Claims, 2 Drawing Sheets

(56) References Cited

U.S. PATENT DOCUMENTS

| | | | | |
|---|---|---|---|---|
| 10,187,172 B2* | 1/2019 | Nakagawa | | H04J 14/0212 |
| 10,270,530 B2* | 4/2019 | Feng | | H04J 14/02 |
| 10,454,660 B2* | 10/2019 | Hisano | | H04L 5/14 |
| 2002/0147030 A1* | 10/2002 | Chun | | H04W 24/04 |
| | | | | 455/561 |
| 2003/0072055 A1* | 4/2003 | Mickelsson | | H04B 10/25754 |
| | | | | 398/79 |
| 2004/0096222 A1* | 5/2004 | Cagenius | | H04B 10/25755 |
| | | | | 398/115 |
| 2004/0208537 A1* | 10/2004 | Lee | | H04J 14/0226 |
| | | | | 398/41 |
| 2008/0145056 A1* | 6/2008 | Boldi | | H04J 14/0226 |
| | | | | 398/96 |
| 2009/0316608 A1* | 12/2009 | Singh | | H04W 88/085 |
| | | | | 370/280 |
| 2010/0098433 A1* | 4/2010 | Boyd | | H04J 3/0658 |
| | | | | 398/155 |
| 2010/0234035 A1* | 9/2010 | Fujishima | | H04L 5/001 |
| | | | | 455/450 |
| 2012/0236774 A1* | 9/2012 | Guey | | H04W 28/16 |
| | | | | 398/68 |
| 2013/0089336 A1* | 4/2013 | Dahlfort | | H04B 10/25759 |
| | | | | 398/115 |
| 2013/0121248 A1* | 5/2013 | Lee | | H04W 74/00 |
| | | | | 370/328 |
| 2013/0136068 A1* | 5/2013 | Johansson | | H04W 88/085 |
| | | | | 370/329 |
| 2013/0260772 A1 | 10/2013 | Kim et al. | | |
| 2013/0343755 A1* | 12/2013 | Cvijetic | | H04Q 11/0066 |
| | | | | 398/45 |
| 2014/0031049 A1 | 1/2014 | Sundaresan et al. | | |
| 2014/0072299 A1* | 3/2014 | Stapleton | | H04B 10/25754 |
| | | | | 398/45 |
| 2014/0105600 A1* | 4/2014 | Dahlfort | | H04J 14/0204 |
| | | | | 398/48 |
| 2014/0161447 A1* | 6/2014 | Graves | | H04Q 11/0005 |
| | | | | 398/48 |
| 2014/0226736 A1* | 8/2014 | Niu | | H04L 27/2628 |
| | | | | 375/260 |
| 2014/0241717 A1* | 8/2014 | Cvijetic | | H04Q 11/0067 |
| | | | | 398/48 |
| 2014/0355986 A1* | 12/2014 | Trojer | | H04Q 11/00 |
| | | | | 398/49 |
| 2015/0104170 A1* | 4/2015 | Xia | | H04J 14/0202 |
| | | | | 398/48 |
| 2015/0207587 A1* | 7/2015 | Laraqui | | H04J 14/0272 |
| | | | | 398/68 |
| 2015/0215044 A1* | 7/2015 | Cvijetic | | H04Q 11/0062 |
| | | | | 398/48 |
| 2015/0215914 A1* | 7/2015 | Cho | | H04W 28/10 |
| | | | | 370/235 |
| 2015/0229397 A1* | 8/2015 | Shibata | | H04B 10/25754 |
| | | | | 398/115 |
| 2015/0365934 A1* | 12/2015 | Liu | | H04L 5/0039 |
| | | | | 370/329 |
| 2017/0063486 A1* | 3/2017 | Sarashina | | H04J 14/0221 |
| 2017/0163342 A1* | 6/2017 | Testa | | H04W 48/00 |
| 2017/0164215 A1* | 6/2017 | Chen | | H04W 24/02 |
| 2017/0202005 A1* | 7/2017 | Madan | | H04W 72/1231 |
| 2018/0034574 A1* | 2/2018 | Cavaliere | | H04J 3/1652 |
| 2018/0124482 A1* | 5/2018 | Bottari | | H04J 3/1611 |
| 2018/0124730 A1* | 5/2018 | Ruffini | | H04L 47/50 |
| 2018/0146509 A1* | 5/2018 | Ruffini | | H04W 88/085 |
| 2018/0206203 A1* | 7/2018 | Ruffini | | H04W 56/001 |

OTHER PUBLICATIONS

Vall-Ilosera et al, COCONUT Requirements for Residential, Business and Outdoor Scenarios, Sep. 2013, ICTON, Tu.C3.5, All Document. (Year: 2013).*

International Search Report and Written Opinion, dated Apr. 7, 2016, from corresponding PCT Application No. PCT/EP2015/068186.

Ericsson, "Response to R3-151081", 3GPP TSG-RAN WG3 Meeting #88, R3-151177, May 25-29, 2015, Fukuoka, Japan, pp. 1-2.

Wan—General, retrieved from url: https://www.zyxel.com/tr/tr/guidemo/zyw70/h_WAN_General.html, retrieved from online on May 20, 2019, 12 pages.

Communication under Rule 71(3) EPC—EP application No. 15750032.3—dated Jun. 19, 2019—28 pages.

* cited by examiner

COMMUNICATIONS NETWORK CONTROL

TECHNICAL FIELD

This relates to the control of a communications network, and in particular a communications network that is used for transporting signals of different types.

BACKGROUND

In a conventional Radio Access Network (RAN) architecture, radio base stations are provided. Such radio base stations include radio transceiver circuitry for communicating with user devices over a wireless interface. The radio base stations also include baseband processing circuitry, for converting signals received over the wireless interface into a form that can be transmitted over a backhaul link to a core network, and equally can convert signals received from the core network into a form that can be transmitted over the wireless interface. A new RAN architecture has been introduced, in which the baseband has been decoupled from the radio and placed in centralized site. In such an architecture, a pool of Digital Units (DU) receives mobile traffic originated by clusters of Remote Radio Units (RRU) over Common Public Radio Interface (CPRI) flows. Baseband processing of the physical layer (PHY or L1), the datalink layer (L2) and the network layer (L3) is carried out in the Digital Units.

When a legacy operator builds a network using this new RAN architecture, it will often have legacy Radio Base Stations in its existing cell sites. In addition, it can still be appropriate to install new Radio Base Stations (for example pico Radio Base Stations, or Wi-Fi access points) in some cases. In such a situation, it is convenient to be able to use the same network infrastructure to transport Ethernet traffic, from such Radio Base Stations on the same physical infrastructure as the Common Public Radio Interface traffic flowing between the RRUs and the DUs.

However, current transport solutions do not address how the transport network can concurrently cope with these various radio layer requirements in providing, and dynamically adjusting, the connectivity service offered to the client radio layer. This limitation can result in a bandwidth waste or in reduced service levels.

SUMMARY

According to a first aspect of the disclosure, there is provided a method of operation of a communications network. The method comprises receiving a plurality of dynamic radio traffic requests from wireless communications nodes, wherein the traffic requests comprise requests for backhaul traffic received from radio base stations, and requests for fronthaul traffic to digital units received from remote radio units. The radio traffic requests are translated into corresponding transport layer requirements. Transport network resources are requested for the radio traffic based on the transport layer requirements, which meet the radio traffic requests.

Thus, radio traffic is effectively carried across a communications network.

The transport layer requirements may comprise at least one of: a required bandwidth, a maximum tolerated delay, and a maximum tolerated latency imbalance.

In some embodiments, translating the radio traffic requests into corresponding transport layer requirements comprises: determining whether the radio traffic requests include radio traffic requests from wireless communication nodes forming a coordination cluster, and, if so, generating a transport network resource request for linked resources for the radio traffic from the wireless communication nodes forming the coordination cluster.

In some embodiments, translating the radio traffic requests into corresponding transport layer requirements comprises: determining whether the radio traffic requests include radio traffic requests from wireless communication nodes involved in a handover, and, if so, generating a transport network resource request for linked resources for the radio traffic from the wireless communication nodes involved in the handover.

The transport network may comprise a plurality of optical channels, in which case the linked resources comprise resources that follow the same physical path, or resources on the same optical channel.

The transport network may comprise a plurality of optical channels. The method may comprise determining whether it is possible to allocate transport network resources on a single optical channel to meet a radio traffic request, and if so, requesting transport network resources on a single optical channel, or, if not, requesting transport network resources on multiple optical channels that follow the same physical path.

The method may comprise receiving the plurality of dynamic radio traffic requests from wireless communications nodes via a radio control node. The method may then further comprise: determining whether it is possible to allocate transport network resources to the radio traffic to meet the radio traffic requests; and, if it is not possible to allocate transport network resources to the radio traffic to meet the radio traffic requests, providing feedback to the radio control node. The feedback may initiate the at least one wireless communications node to provide an alternative radio traffic request with relaxed requirements. The feedback may request relaxed requirements, or the receipt of such a feedback message may trigger the radio control node to determine and transmit to the network controller the relaxed requirements.

The method may comprise requesting the transport network resources from a transport control node.

The transport network may comprise a plurality of border nodes, for receiving said traffic.

The transport network may comprise at least one hub node, for directing backhaul traffic received from radio base stations to at least one packet switch, and for directing fronthaul traffic received from remote radio units to respective digital units.

According to a second aspect of the disclosure, there is provided a network controller, configured for performing a method of the first aspect.

The network controller may comprise: a processor; and a memory, the memory containing stored instructions for causing the network controller to performing the method according to the first aspect.

A network controller may comprise a receiving module, for receiving a plurality of dynamic radio traffic requests from wireless communications nodes. The traffic requests comprise requests for backhaul traffic received from radio base stations, and requests for fronthaul traffic to digital units received from remote radio units. The network controller further comprises a translating module, for translating the radio traffic requests into corresponding transport layer requirements; and a requesting module, for requesting transport network resources for the radio traffic based on the transport layer requirements, which meet the radio traffic requests.

According to a further aspect of the disclosure, there is provided a computer program product, configured when run on a computer to perform a method according to the first aspect.

DETAILED DESCRIPTION

Figure 1:
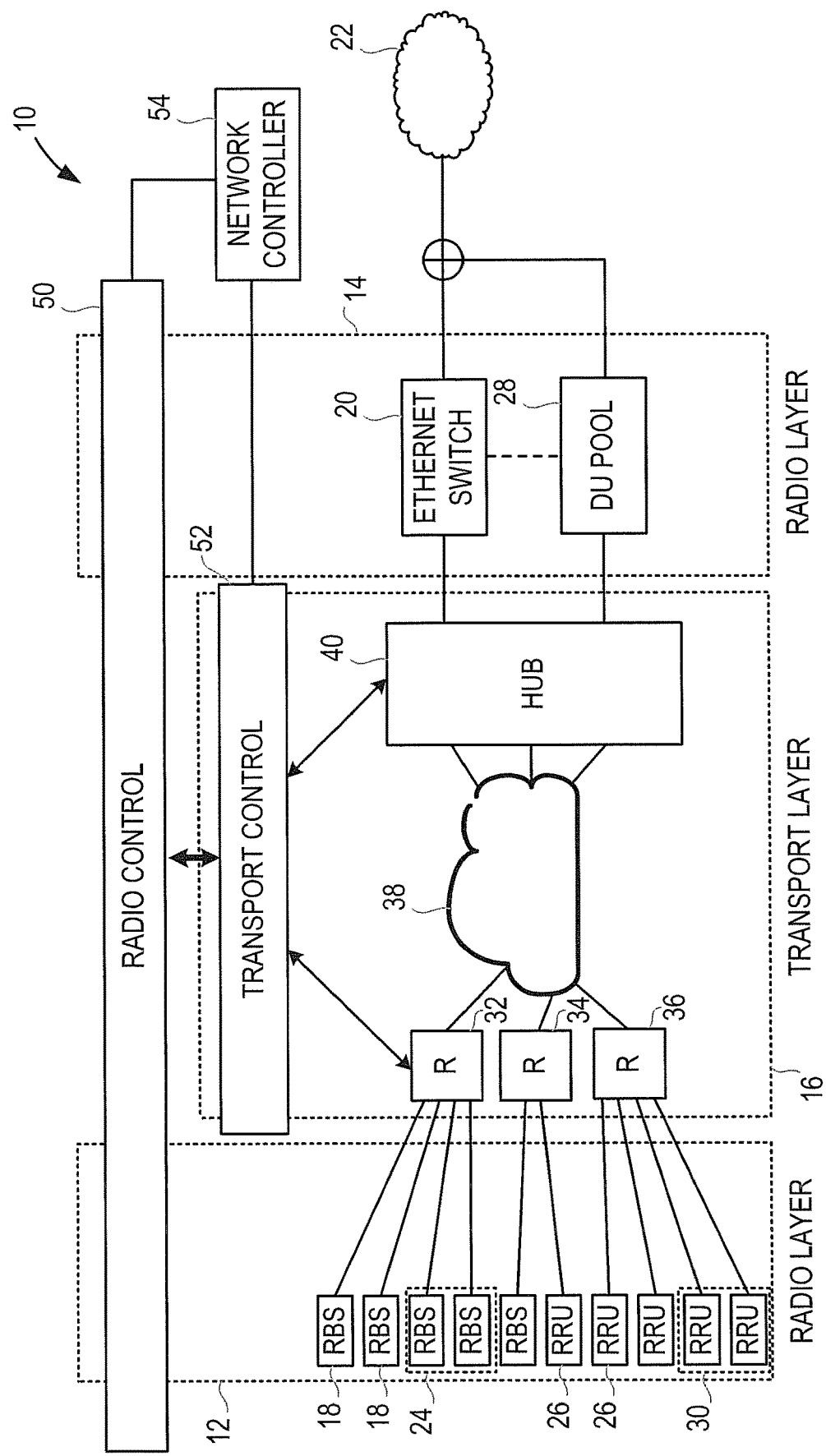
FIG. 1 is a schematic diagram of a communications system.

FIG. 1 illustrates a communication system 10, for carrying mobile data traffic.

The system includes a radio access network (RAN), or radio layer, 12, 14 and a transport network, or transport layer 16.

The radio access network provides service to mobile communications devices within the relevant coverage area. In the illustrated system 10, by way of example, the radio access network comprises a number of Radio Base Stations (RBS) 18, which may for example be pico Radio Base Stations (pRBS), or Wi-Fi access points. The radio base stations 18 have radio transceiver circuitry for communicating with user devices over a wireless interface. The radio base stations 18 also include baseband processing circuitry, for converting signals received over the wireless interface into a form that can be transmitted over a backhaul link to a core network, and equally can convert signals received from the core network into a form that can be transmitted over the wireless interface. The different radio base stations 18 may produce traffic at different rates. Thus, the radio base stations 18 are connected to one or more packet switch, such as an Ethernet switch, 20, which is in turn connected to the core network 22 of the communication system 10.

The system described here by way of illustration, uses an Ethernet connection for the backhaul link, but it is possible to use any packet based interface, for transporting data plane and/or control plane traffic for the purpose of backhaul from a RBS towards the core network.

The radio base stations 18 may include one or more groups of radio base stations 18 that form a coordination cluster 24. When a group of radio base stations 18 forms a coordination cluster 24, this may impose requirements on the network. For example, it may be required that the radio base stations 18 should be closely synchronized.

In the illustrated system 10, the radio access network further comprises a number of Remote Radio Units (RRU) 26. A Remote Radio Unit 26 includes radio transceiver circuitry for communicating with user devices over a wireless interface, but does not include baseband processing circuitry. Rather, the baseband circuitry is decoupled from the radio and placed in a centralized site. As shown in FIG. 1, a pool 28 of Digital Units (DU) is provided, and the Digital Unit receives mobile traffic originated by Remote Radio Units. The traffic is in the form of digitized radio signals, e.g. I/Q data flows, for example using Common Public Radio Interface (CPRI). The different Remote Radio Units 26 may produce traffic at different rates. Baseband processing of the physical layer (PHY or L1), the datalink layer (L2) and the network layer (L3) is then carried out in the Digital Units.

As this architecture involves transporting the unprocessed radio signals from the Remote Radio Units to the Digital Unit, over CPRI flows, and because CPRI is designed to give the baseband full control of the antenna signals, a higher bandwidth is needed than for conventional backhaul. There are however many different possibilities for splitting the required functionality between the RRUs and the DUs, for example, keeping the processing of one or more lower layer at the RRU and moving just the processing of the higher layers to the DU. In that case, the amount of data to be exchanged between the two node entities is lower than when the full processing is performed at the DU. A suitable variant of CPRI, or other protocol, can then be used for the fronthaul transport.

In addition, as the transport network should be able to satisfy the requirements of the LTE layer protocol operation and of the CPRI specification, this implies accurate synchronization and strict latency control.

Although CPRI flows are mentioned here by way of example, any suitable interface (datagram or not) can be used to carry radio symbols between a DU and a RRU for the purpose of fronthaul, in which baseband processing (or a subset of radio functions) from a group of RBS are centralized in a common node.

The Digital Units of the pool 28 are then connected to the core network 22 of the communication system 10.

As with the radio base stations 18, the Remote Radio Units 26 may include one or more groups of Remote Radio Units that form a coordination cluster 30. When a group of Remote Radio Units form a coordination cluster 30, this may impose requirements on the network. For example, it may be required that the Remote Radio Units 26 should be closely synchronized.

Thus, the radio access network includes multiple wireless communications nodes (e.g. RBS, RRU), which, in this illustrated embodiment, operate with local, partially centralized or fully centralized baseband processing, and therefore have different requirements for transporting signals. The requirements of the wireless communications nodes also vary with time.

As shown in FIG. 1, the same physical network infrastructure is used to provide the transport layer 16 for transporting the backhaul (for example Ethernet) traffic from the Radio Base Stations 18 as is used for the fronthaul (for example Common Public Radio Interface) traffic flowing between the RRUs and the DUs. As described in more detail below, the transport layer is organized to convey fronthaul traffic and backhaul traffic over the same infrastructure to guarantee different transport services for the mobile network when and where needed.

In the example shown in FIG. 1, transport layer border nodes, or remote nodes (R), 32, 34, 36 are provided for receiving client traffic from the RBSs 18 and RRUs 26. The border nodes 32, 34, 36 are typically located in the vicinity of the respective RBSs 18 and RRUs 26, though not necessarily at the same sites.

The border nodes 32, 34, 36 may for example have a lower layer based on optical technology while upper layers can involve one or more packet layers such as Internet Protocol (IP), Multiprotocol Label Switching (MPLS), and Ethernet.

FIG. 1 shows one border node 32 that receives connections from RBSs 18, and shows one border node 36 that receives connections from RRUs 26. However, FIG. 1 also shows one shared border node 34 that allows Ethernet client RBSs 18 and CPRI client RRUs 26 to enter the transport layer 16. This is particularly useful in the case where different client types share the same optical channel (e.g. sub-wavelength).

The network 38 implementing the transport layer is used to convey the traffic to a hub node 40, typically located in a central office. As with the border nodes 32, 34, 36, the hub node has the lower layer based on optical technologies and the upper layer based on packet layers, coherently with the peering border nodes. Although FIG. 1 shows a single hub, a typical network will include multiple hubs, each serving a group of border nodes. Each border node is served by one hub, though hubs can be duplicated for resiliency purposes.

The hub node 40 is able to de-wrap Ethernet traffic from the optical channels, and send it to the Ethernet switch 20 towards the backhaul. Similarly, CPRI traffic is de-wrapped and sent to the DU pool 28 for baseband processing and subsequent backhauling. Of course, traffic will be bidirectional, such that the hub node is also able to receive traffic from the core network 22 and send it in the required format to the relevant RBSs 18 and RRUs 26 over the network 38 and through the border nodes 32, 34, 36.

FIG. 1 shows a radio control block 50, which determines which radio access network entities (that is, which of the RBSs and RRUs) need to be coupled with the backhaul or with the baseband processing entities (that is, with the Ethernet switch 20 of the DU pool 28).

FIG. 1 also shows a transport control block 52, which receives static and dynamic connectivity demands, possibly grouped in traffic matrixes, and determines the best possible path to serve each demand at the given time or in a planned time interval.

FIG. 1 also shows a network controller 54, which is a logical module implementing the method described in more detail below.

Figure 2:
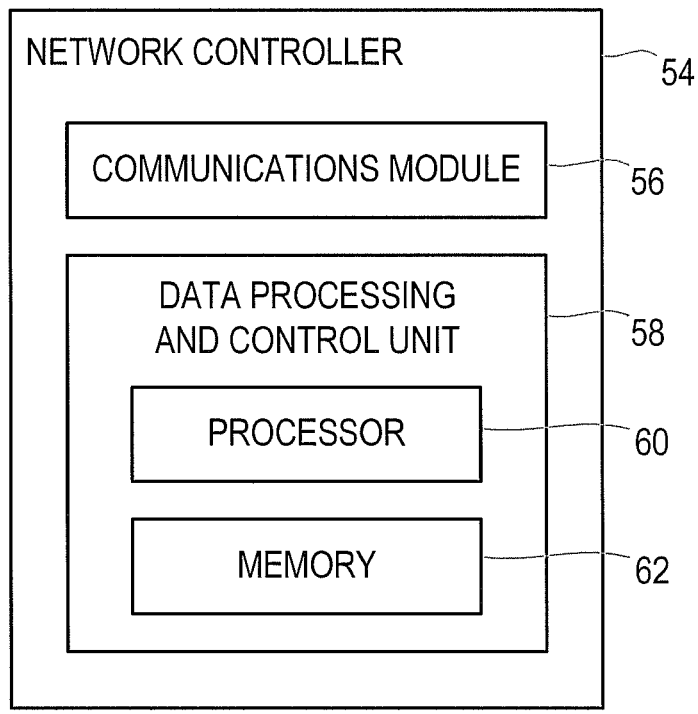
FIG. 2 is a schematic diagram illustrating a network controller in the communications system of FIG. 1.

FIG. 2 shows in more detail the form of the network controller 54. Specifically, the network controller 54 includes a communications module 56 and a data processing and control unit 58. The data processing and control unit 58 includes a processor 60 and a memory 62. The processor 60 performs data processing and logical operations, and the memory 62 stores working data and program instructions for causing the processor to perform the methods described herein. The communications module 56 receives inputs from, and generates control signals for, the radio control block 50 and the transport control block 52.

Figure 3:
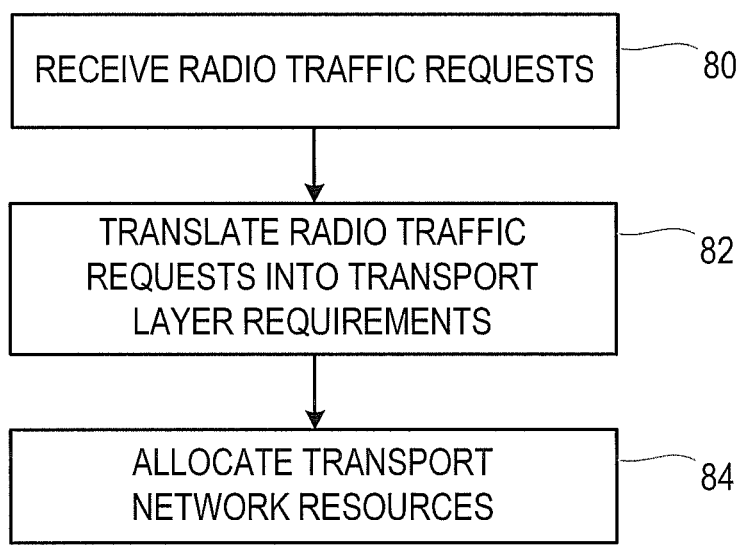
FIG. 3 is a flow chart, illustrating a method as described herein.

FIG. 3 is a flow chart, illustrating a method performed in the network controller 54.

Specifically, in step 80, the network controller 54 receives a message from the radio control block 50, requesting to establish a connectivity across the transport network. This message can be in the form of a single radio traffic request or can include a series of radio traffic requests collected in a traffic matrix. The radio control block 50 is arranged to request an end to end connection, and is unaware of how the transport network will be configured to satisfy the radio requirements. The message from the radio control block 50 includes dynamic radio traffic requests from wireless communications nodes, which may comprise request for backhaul traffic received from radio base stations, and requests for fronthaul traffic to digital units received from remote radio units. It will be appreciated that, in all practical scenarios, the overall level of mobile traffic and the distribution of the traffic between the different access points will be likely to change over time. Thus, the traffic requests define attributes of the mobile traffic that are to be satisfied in traversing the transport layer. The radio traffic requests can be time limited, that is, they can be stated in advance to apply only to a given time interval. The solution applies also in case further requirements will be included.

Each traffic request may for example include some or all of the following: the cell site entity originating the traffic, whether this is a RRU or an RBS, and the destination, whether this is an Ethernet reference point or a DU in a pool, the traffic type (for example, Ethernet, CPRI, or any other available traffic type); a required bandwidth; and/or other parameters and constraints that are required to be considered by the transport layer.

For example, a CPRI signal is specified with a simple multiplexing structure based on the lowest line rate of 614 Mbps, with higher capacity signals up to 10 Gbps using multiple streams in parallel. Some currently commercially available products operate at CPRI rates of 2.5 Gbps, 5 Gbps, and 10 Gbps. Within CPRI flows, the basic frames are the Antenna Carriers (AxC), each of which contains the amount of digital baseband I/Q data for reception or transmission of one carrier at one independent antenna element. Different mobile radio technologies can be transported with the same CPRI interface but with different constraints on transport. For example, the maximum tolerated one way delay between a RRU and a DU is ~200 µs for GSM/WCDMA traffic and ~75 µs for LTE traffic.

Other constraints are imposed on the latency unbalance (that is, the asymmetry between the downlink and the uplink) and the jitter.

As another example, an Ethernet signal, because it is transporting already processed radio traffic, has fewer limitations than CPRI and a significantly lower bandwidth demand. However specific synchronization solutions have to be provided. As an example when frequency synchronization is provided via timing packets carried over the transport network, then the synchronization traffic shall be managed in the highest priority class of service over Ethernet.

If relevant, the traffic request may also include details on any relevant coordination cluster relations.

A coordination cluster of radio access network entities comprises entities that may be at multiple, geographically separated sites, and that may have different geographical coverage areas, where the transmission and/or reception is coordinated in order to improve system performance.

In step 82 of the process shown in FIG. 3, the network controller 54 translates the radio traffic requests into transport layer requirements. Specifically, in one example, the step of translating the radio traffic requests into transport layer requirements comprises considering a specific predefined subset of the radio parameters, and mapping them to relevant transport requirements.

This translation includes parsing the traffic requests to determine if the requirements impose any specific requirements in routing the traffic. For example, the radio control may provide coordination requirements relating to a coordination cell. For example, some cells may implement a function such as MIMO or joint processing, requiring very tight phase alignment. In such a case, the translating step 82 may determine that the relevant radio data (e.g. CPRI) flows should be transported on a single optical channel. Alternatively, the translating step 82 may comprise a determination that the CPRI flows are carried on a plurality of optical channels that follow the same end to end paths in order to minimize the related phase deviations. This provides for coordination requirements needed for a coordination cell to be satisfied by the transport network.

As a further step, the network controller 54 determines if some traffic requests require an amount of bandwidth that is greater than the maximum available for a single channel in the transport layer. If so, the network controller 54 determines that the traffic requests will be distributed onto multiple channels, e.g. multiple optical channels.

The step 82 of translating the radio traffic requests into transport layer requirements has the advantage that changes to the radio access network, such as introducing new nodes or nodes that use different radio technologies, or different protocols, or split the baseband functionality in different ways, can be accommodated. This is because the network controller 54 can simply consider the relevant transport layer requirements. That is, the radio parameters that are provided as inputs to the transport layer are agnostic of the radio interface and technology (e.g. LTE) that are used. Thus, the method keeps the radio and transport layers separated, while providing tight cooperation between them. The network controller 54 is also separated from the transport control 52. Thus, the transport resources and changes to the transport layer are handled by the transport control 52. Thus, the network controller 54 can be independent of the technology used by the transport layer 16.

This also allows the transport network to be shared by multiple radio network operators. Each radio network feds the controller with its own policies that determine the network requirements, and then generates traffic requests as required.

In step 84 of the process shown in FIG. 3, the network controller 54 allocates the transport network resources to the received radio traffic requests. Specifically, the network controller 54 may operate to determine the most efficient bandwidth allocation in the transport layer such that the desired attributes of the radio traffic are met.

Thus, the radio layer needs are considered with the transport layer capabilities and limitations to optimize the transport resources while meeting the radio requirements. The network controller 54 may be considered as generating transport requests which provide for setting up an optimized transport network, which effectively allows meeting of the radio requirements. Very different requirements of the radio layer, such as the requirements for Ethernet and CPRI traffic, are considered concurrently in the routing task, facilitating a joint optimization of the transport network while meeting the differentiated radio requirements. The network controller 54 may be considered as receiving the radio requirements and information on the available transport network resources, and determining an assignment, or constraints on assignment, of the radio traffic to the (e.g. optical) transport network.

As an example, when a single channel is not sufficient to transport a client demand, it is possible to split correlated clients over several optical channels (multi-wavelength transport) and recombine them at the destination. In general, it is preferred that this splitting and recombining over a set of wavelengths should use channels that follow the same path from source to destination. However, different paths can be considered if all the imposed radio constraints are still satisfied.

When the current resource allocation in the transport layer does not allow an allocation of transport network resources that properly satisfies the incoming traffic requests, the network controller 54 can evaluate a possible displacement of existing client traffic onto alternative optical channels, in order to reserve qualified transport bandwidth to more critical client traffic.

In some examples, the network controller 54 may determine that the transport layer 16 cannot serve one or more traffic demands from the radio control 50 with the desired service level and transmission quality. In this case, the network controller 54 sends feedback to the radio layer (i.e. to the radio control 50), requesting to relieve (reduce) constraints imposed on the transport. This implies, for example, relaxing coordination levels at the radio layer side. For example, the network controller 54 may determine that a requested radio traffic requirement (e.g. synchronization, latency), cannot be met with the available transport resources. In some examples, the feedback (i.e. a feedback message from the network controller 54 to the radio control node) allows the radio control 50 to determine if a different radio operation is possible (e.g. with lower requirements), and send a further request for transport resources to the network controller 54. The network controller 54 may determine if these different requirements can be implemented by the transport network, and if so, assign the resources by communication with the transport control 52. In some examples, the network controller 54 receives from the radio control 50 priority information (e.g. a priority flag) indicating whether particular traffic can be given a priority over other traffic and/or for which transport requirements may/may not be relaxed.

The operation of the method is further illustrated by way of an example.

In the illustrative example, a macro cell is constituted by three sectors operating LTE 20 MHz, and is coordinated with five associated outdoor small cells. This is a typical scenario in a dense urban environment. The six cells have their coordinated baseband processing at a central location, or hub site, where a pool of Digital Units is located.

The macro cell employs three CPRI flows at 2.5 G, that is, one per sector. Each of the five small cells employs a CPRI flow at 2.5 G. Thus, there are eight CPRI flows required between the respective Remote Radio Units and the Digital Units.

This radio context demands a 20 Gbps bandwidth connectivity from the transport layer, to transport 8×2.5 Gbps CPRI flows. The maximum tolerated delay for CPRI (in the case of LTE), is 75 µs.

As the network controller 54 receives the radio traffic requests, it determines the implications on routing in the transport layer.

In order to fulfill coordination requirements, the CPRI flows can advantageously follow the same path across the network. This can be achieved, for example, by using two contiguous 10 Gbps wavelengths over the same end to end path. This is the first requirement for the transport layer.

The network controller 54 also considers the requirements as regards the delay. The passive fiber typically used in an optical transport network introduces a delay of D per km, given by D=1/v, where v is the speed of light in the transmission medium (that is, the fiber), and v=c0/n, where c0 is the speed of light in a vacuum, and n is the refractive index of the fiber. This implies that, as c0≈3×10$^8$ m/s, and n≈1.5, D≈5 ns/m or ≈5 µs/km.

As mentioned above, the maximum tolerated delay is 75 µs, and so this results in a distance limitation in the fiber of:

$$L_{Max}=75 \text{ µs}/5 \text{ µs/km}=15 \text{ km}.$$

This is a second requirement for the transport layer. The network controller 54 discards every path that exceeds 15 km in length. In the case of wireless communications nodes operating using WCDMA, in which the maximum tolerated delay is 200 µs, this limit is relaxed to 40 km.

Thus, the network controller 54 is able to allocate resources to these flows, that meet the requirements in the most efficient way.

It is also necessary to consider the linked issues of synchronization and latency, when determining the transport layer requirements.

The different wireless communications nodes of the radio layer impose various synchronization requirements, and sometimes impose tight latency requirements, depending on the type of traffic that they are carrying. In most systems, some degree of frequency synchronization is required, but standard solutions exist that in general do not put particular challenging requirements on the transport network.

More relevant are the situations where there is also a need to control phase deviations between the radio signals delivered by the radio base stations. For example, this may apply when the radio base stations are part of a system using Time Division Duplex (TDD) operations. In this case, the deviation between radio signals delivered by the base stations can be up to 3 µs, so that the base station is able to recover an absolute time reference with an accuracy of +/−1.5 µs.

Certain coordination features, often required between small cells and between small cells and macro cells, also need phase alignment in the ps range for optimum operation.

A typical case is the phase accuracy requirement for Coordinated Multi-Point (CoMP) transmission, which is particularly demanding (requiring sub-ps differences between different flows so that the radio signals are aligned in phase). This is also the case where very stringent latency requirements apply (which again may be sub-ms).

Another situation in which there are strict requirements for synchronization between flows is in the case of Multiple-Input, Multiple-Output (MIMO) transmissions, in which there may for example be a requirement for a maximum time difference of 65 ns between the flows through the different antennas.

One possibility is to identify a number of high level classes of radio services in terms of their synchronization requirements. It is then possible to verify whether a particular feature can be supported over a specific path, that is, whether the path is short enough and whether the nodes of the path support the features required to provide the required synchronization.

For example, a first class of service may have no need for phase synchronization between flows, and no specific latency requirements.

A second class of service may require phase accuracy in the 1.5 ps range, with no specific latency needs.

A third class of service, for example for Coordinated Multi-Point (CoMP) transmission, may require phase accuracy in the 0.5 ns range, possibly with stringent latency requirements.

A fourth class of service, for example for CPRI links supporting MIMO transmissions, may require phase accuracy in the 50 µs range, coupled with very stringent latency requirements.

This classification can be considered in the set-up of the specific transport resources (e.g. verifying the feasibility of supporting certain features over a certain path, as mentioned above). Thus, while CPRI traffic must meet certain latency requirements, certain more stringent requirements will only be necessary to support certain features, such as MIMO, or CoMP, or specific CoMP features.

There is thus described a method of operation of a communications network that allocates transport layer resources to meet the requirements of a radio layer, despite the disparate nature of those requirements.

In some aspects, the network controller 54 may be considered as receiving the radio traffic requests to transport the data. These requests have particular requirements, but the radio requests are made only on the basis of the radio technology, without knowledge or consideration of the transport network to be used. The network controller 54 is configured to translate these radio requests into transport requests, which are relevant to a handling by the transport network 38. For example, the network controller 54 imposes a requirement on the transport control 52, in order to meet the radio request. For example, the network controller 54 may require that particular CPRI flows (e.g. from a coordination cluster) are carried in a same optical channel, or in optical channels having the same path through the network. The implementation of these transport requests may be carried out by the transport control 52.

It should be noted that the above-mentioned embodiments illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of operation of a communications network, the method comprising:
 receiving a plurality of dynamic radio traffic requests from wireless communications nodes, wherein the radio traffic requests comprise requests for backhaul traffic received from radio base stations, and requests for fronthaul traffic to digital units received from remote radio units;
 translating the radio traffic requests into corresponding transport layer requirements, wherein translating the radio traffic requests into the corresponding transport layer requirements comprises determining whether the radio traffic requests include radio traffic requests from wireless communication nodes forming a coordination cluster, and, if so, generating a transport network resource request for linked resources for radio traffic from the wireless communication nodes forming the coordination cluster;
 requesting transport network resources for the radio traffic based on the transport layer requirements, which meet the radio traffic requests, wherein a transport network comprises a plurality of optical channels; and
 determining whether it is possible to allocate transport network resources on a single optical channel to meet the radio traffic requests, and
 if so, requesting transport network resources on a single optical channel, or if not, requesting transport network resources on multiple optical channels that follow a same physical path.

2. A method as claimed in claim 1, wherein the transport layer requirements comprise at least one of a required bandwidth, a maximum tolerated delay, and a maximum tolerated latency imbalance.

3. A method as claimed in claim 1, wherein translating the radio traffic requests into corresponding transport layer requirements comprises:
 determining whether the radio traffic requests include radio traffic requests from wireless communication nodes involved in a handover, and, if so, generating a transport network resource request for linked resources for the radio traffic from the wireless communication nodes involved in the handover.

4. A method as claimed in claim 1, wherein the transport network comprises a plurality of optical channels, and wherein the linked resources comprise resources that follow a same physical path.

5. A method as claimed in claim 1, wherein the transport network comprises a plurality of optical channels, and wherein the linked resources comprise resources on a same optical channel.

6. A method as claimed in claim 1, comprising receiving the plurality of dynamic radio traffic requests from wireless communications nodes via a radio control node.

7. A method as claimed in claim 6, further comprising:
determining whether it is possible to allocate transport network resources to the radio traffic to meet the radio traffic requests; and if it is not possible to allocate transport network resources to the radio traffic to meet the radio traffic requests, providing feedback to the radio control node.

8. A method as claimed in claim 7, wherein said feedback initiates at least one wireless communications node to provide an alternative radio traffic request with relaxed requirements.

9. A method as claimed in claim 1, comprising requesting the transport network resources from a transport control node.

10. A method as claimed in claim 1, wherein the transport network comprises a plurality of border nodes, for receiving said radio traffic.

11. A method as claimed in claim 1, wherein the transport network comprises at least one hub node, for directing backhaul traffic received from radio base stations to at least one packet switch, and for directing fronthaul traffic received from remote radio units to respective digital units.

12. A network controller, configured for performing a method as claimed in claim 1.

13. A network controller, comprising:
a processor; and
a memory, the memory containing stored instructions for causing the network controller to perform a method as claimed in claim 1.

14. A network controller, configured to:
receive a plurality of dynamic radio traffic requests from wireless communications nodes, wherein the radio traffic requests comprise requests for backhaul traffic received from radio base stations, and requests for fronthaul traffic to digital units received from remote radio units;
translate the radio traffic requests into corresponding transport layer requirements, wherein to translate the radio traffic requests into the corresponding transport layer requirements, the network controller is configured to determine whether the radio traffic requests include radio traffic requests from wireless communication nodes forming a coordination cluster, and, if so, generate a transport network resource request for linked resources for radio traffic from the wireless communication nodes forming the coordination cluster;
request transport network resources for the radio traffic based on the transport layer requirements, which meet the radio traffic requests; and
determine whether it is possible to allocate transport network resources on a single optical channel to meet the radio traffic requests, and
if so, request transport network resources on a single optical channel, or if not, request transport network resources on multiple optical channels that follow a same physical path.

* * * * *